US012726423B2

(12) United States Patent
Mermoud et al.

(10) Patent No.: US 12,726,423 B2
(45) Date of Patent: Sep. 1, 2026

(54) INFERRING QoE DEGRADATION FROM IMPLICIT SIGNALS IN USER BEHAVIOR

(71) Applicant: Cisco Technology, Inc., San Jose, CA (US)

(72) Inventors: Grégory Mermoud, Venthône (CH); Michal Wladyslaw Garcarz, Cracow (PL); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 27 days.

(21) Appl. No.: 18/131,298

(22) Filed: Apr. 5, 2023

(65) Prior Publication Data

US 2024/0340228 A1 Oct. 10, 2024

(51) Int. Cl.

| | |
|---|---|
| ***H04L 43/0823*** | (2022.01) |
| ***H04L 43/0852*** | (2022.01) |
| ***H04L 67/10*** | (2022.01) |

(52) U.S. Cl.

CPC ...... *H04L 43/0823* (2013.01); *H04L 43/0852* (2013.01); *H04L 67/10* (2013.01)

(58) Field of Classification Search

CPC ........... H04N 21/4424; H04N 21/2183; H04N 21/23103; H04N 21/64723

USPC .......................................................... 709/229

See application file for complete search history.

(56) References Cited

U.S. PATENT DOCUMENTS

| | | | | |
|---|---|---|---|---|
| 10,333,958 B2 | | 6/2019 | Huang et al. | |
| 10,862,771 B2 | | 12/2020 | Tomkins et al. | |
| 11,856,014 B2 | * | 12/2023 | Kare | H04L 63/1425 |
| 12,212,470 B2 | * | 1/2025 | Donthireddy | H04W 12/12 |
| 12,238,129 B2 | * | 2/2025 | Huang | H04L 63/1425 |
| 12,323,452 B1 | * | 6/2025 | Tsironis | H04L 63/1433 |
| 2014/0137246 A1 | * | 5/2014 | Baluda | H04W 12/08 726/22 |
| 2017/0126475 A1 | * | 5/2017 | Mahkonen | H04L 43/0864 |
| 2017/0250855 A1 | * | 8/2017 | Patil | H04L 41/064 |
| 2017/0318043 A1 | * | 11/2017 | Shin | H04L 41/20 |
| 2017/0325120 A1 | | 11/2017 | Szilagyi et al. | |
| 2018/0124082 A1 | * | 5/2018 | Siadati | H04L 63/1425 |
| 2018/0124114 A1 | * | 5/2018 | Woods | G06F 21/577 |
| 2018/0302272 A1 | * | 10/2018 | Makovsky | H04L 41/22 |
| 2018/0316713 A1 | * | 11/2018 | Tsironis | H04L 63/1425 |
| 2019/0116131 A1 | * | 4/2019 | Patil | H04L 41/064 |

(Continued)

FOREIGN PATENT DOCUMENTS

WO WO-2021141674 A1 * 7/2021 ............. G06N 3/044

OTHER PUBLICATIONS

“Endpoint Views Reference”, online: https://docs.thousandeyes.com/product-documentation/end-user-monitoring/viewing-data/endpoint-agent-views-reference, accessed Mar. 27, 2023, 21 pages.

(Continued)

*Primary Examiner* — Tauqir Hussain

(74) *Attorney, Agent, or Firm* — Lee & Hayes, P.C.

(57) ABSTRACT

In one embodiment, a device obtains interaction data indicative of a flow of interactions performed by a user with an online application accessible via a network. The device detects an anomaly by applying an anomaly detection model to the interaction data. The device determines that the anomaly is attributable to a condition present in the network. The device causes performance of an adjustment to the network, to mitigate the condition.

20 Claims, 10 Drawing Sheets

(56) References Cited

U.S. PATENT DOCUMENTS

| | | | | |
|---|---|---|---|---|
| 2021/0211347 | A1* | 7/2021 | Vasseur | H04L 43/16 |
| 2022/0027431 | A1 | 1/2022 | Zheng et al. | |
| 2022/0059619 | A1* | 2/2022 | Kubota | G06F 3/0443 |
| 2022/0131886 | A1 | 4/2022 | Smelov et al. | |
| 2022/0165432 | A1* | 5/2022 | Pickus | G16H 50/70 |
| 2022/0345473 | A1* | 10/2022 | Kare | H04L 63/1425 |
| 2023/0029794 | A1* | 2/2023 | Huang | H04L 63/1425 |
| 2023/0262072 | A1* | 8/2023 | Cambric | G06F 21/55 726/22 |
| 2024/0015076 | A1* | 1/2024 | Donthireddy | H04L 43/55 |
| 2024/0161076 | A1* | 5/2024 | Raiskin | G06Q 20/12 |

OTHER PUBLICATIONS

"XMLHttpRequest", online: https://en.wikipedia.org/wiki/XMLHttpRequest, accessed Mar. 27, 2023, 7 pages.

"Workday", online: https://www.workday.com/, accessed Mar. 27, 2023, 5 pages.

"Github", online: https://github.com/, accessed Mar. 27, 2023, 16 pages.

Huang, et al., "User See, User Point: Gaze and Cursor Alignment in Web Search", CHI '12: Proceedings of the SIGCHI Conference on Human Factors in Computing Systems, May 2012, pp. 1341-1350, Association for Computing Machinery.

* cited by examiner

INFERRING QoE DEGRADATION FROM IMPLICIT SIGNALS IN USER BEHAVIOR

TECHNICAL FIELD

The present disclosure relates generally to computer networks, and, more particularly, to inferring quality of experience (QoE) degradation from implicit signals in user behavior.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Traditionally, SLA thresholds have been used as a proxy for the true quality of experience (QoE) of an online application from the perspective of the end user. In other words, it is assumed that if the SLA is being violated, the QoE of the application is also degraded. While this may hold true in clear situation of network impairment, some of the more complex types of impairments could go unnoticed by network systems because of the specificity of the impairment definition or because of other factors that limit visibility to such impairments.

Assessing the QoE of web-based applications is extremely difficult, as they often feature many different workflows, each triggering very different actions and fulfilling different objectives. For instance, even performing a simple task in an online application often involves multiple user interactions, and can be done using a variety of approaches, each involving different resources to be fetched by the browser (e.g., via Quick Tasks from the homepage, via the Search field, or via the Menu). Often, the experience of a user in this context is highly dependent on the chosen workflow, how quickly resources can be fetched (which may depend on caching as well), and/or other factors.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
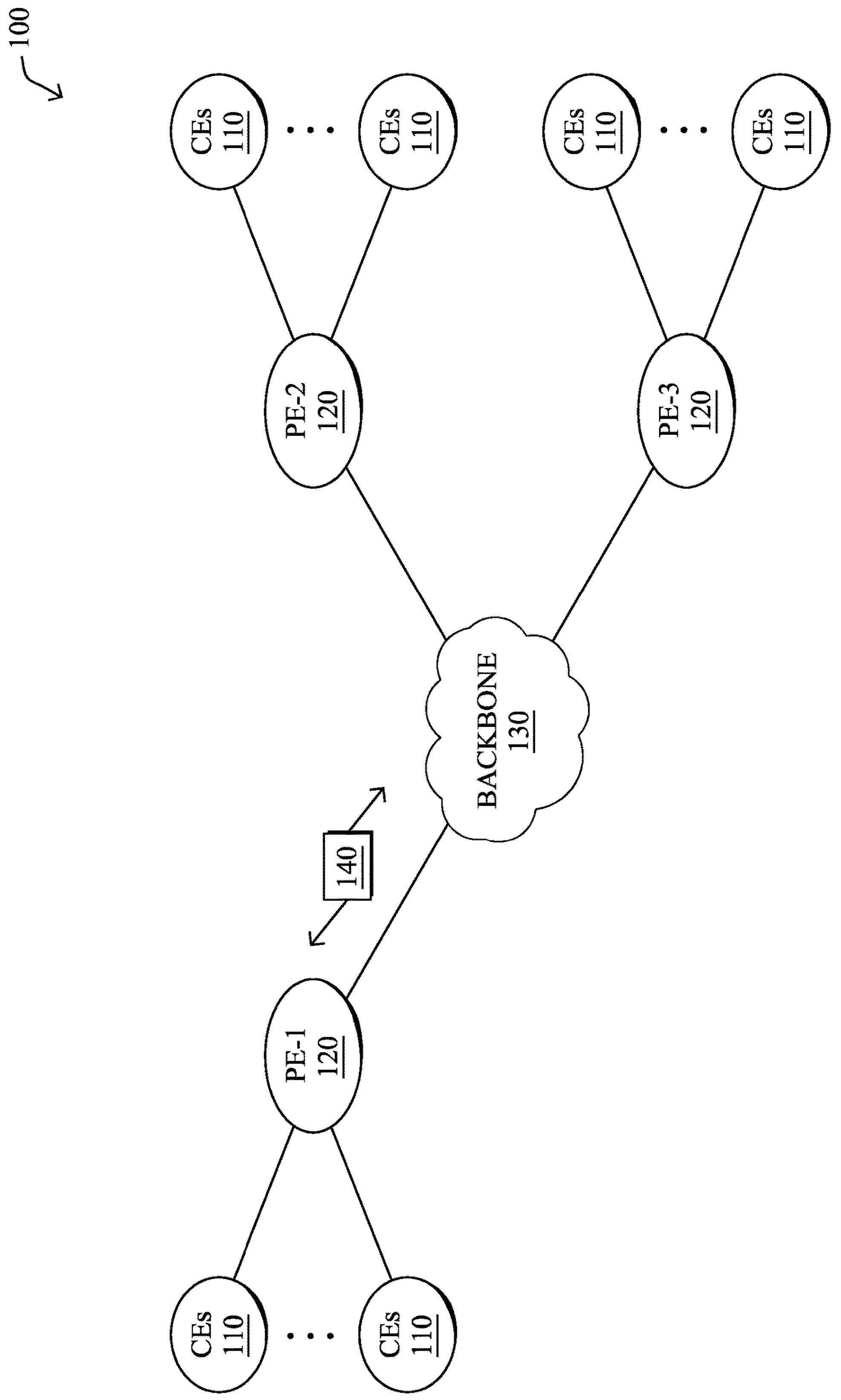
FIGS. 1A-1B illustrate an example communication network.

According to one or more embodiments of the disclosure, a device obtains interaction data indicative of a flow of interactions performed by a user with an online application accessible via a network. The device detects an anomaly by applying an anomaly detection model to the interaction data. The device determines that the anomaly is attributable to a condition present in the network. The device causes performance of an adjustment to the network, to mitigate the condition.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
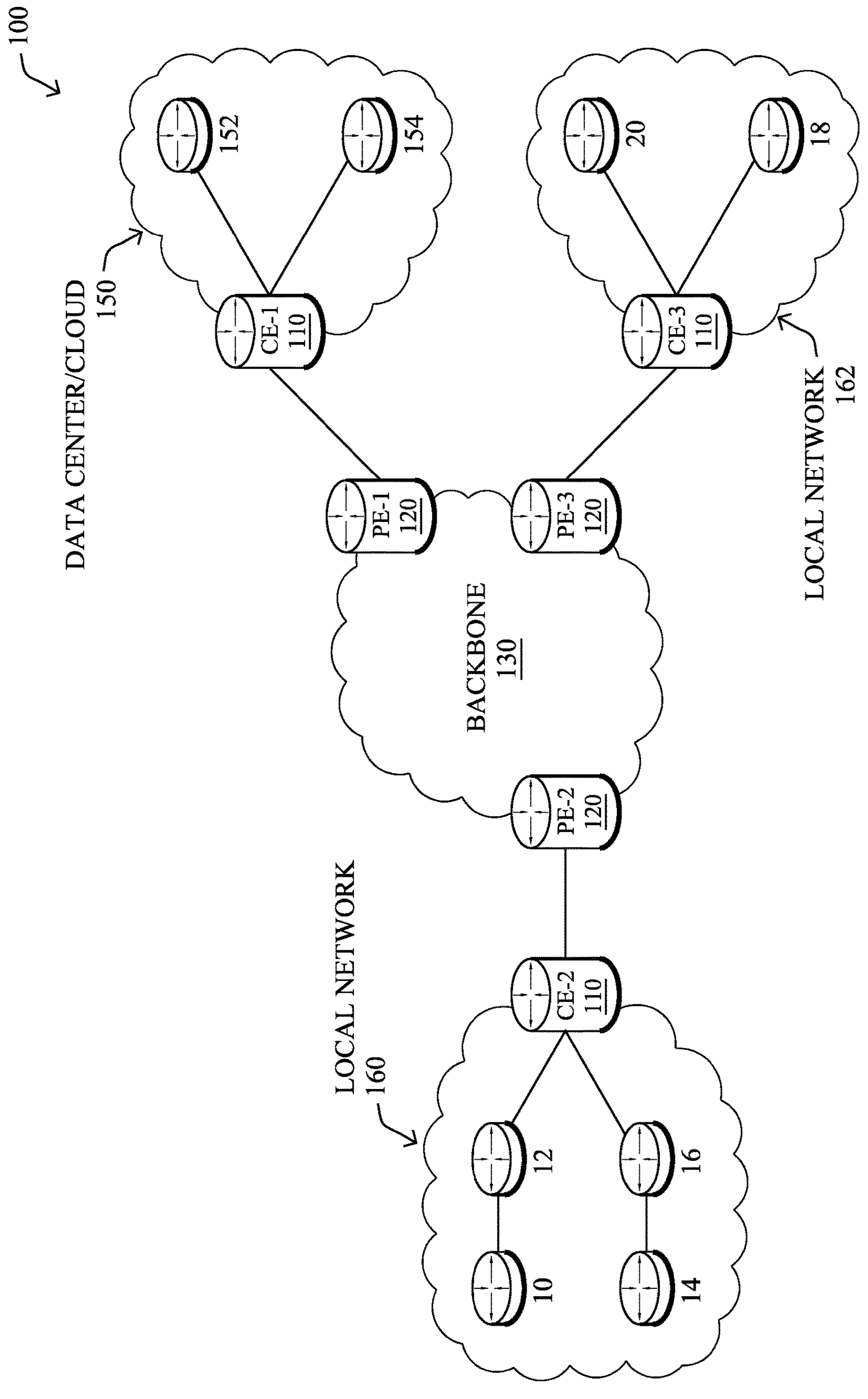

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
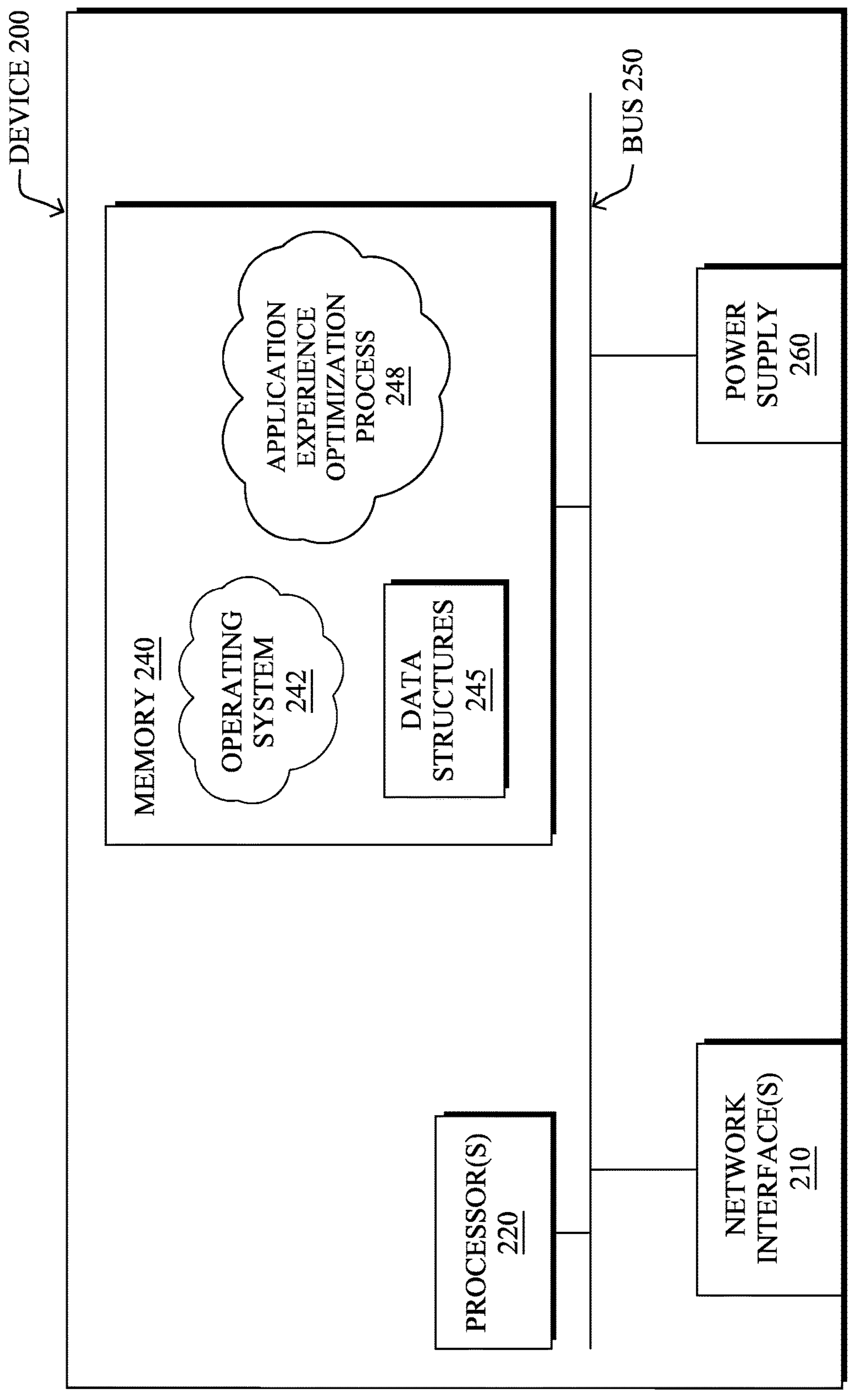
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
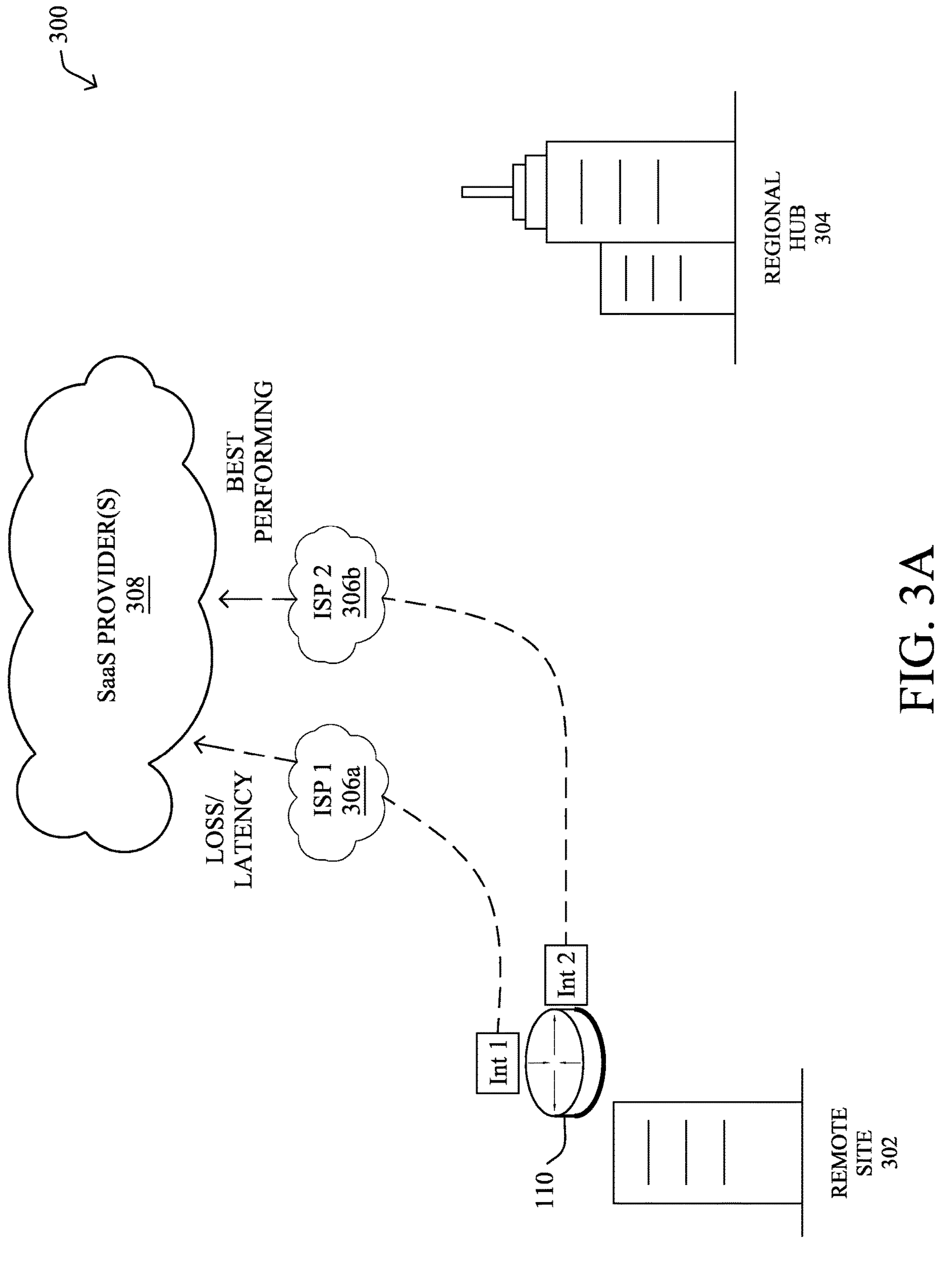
FIGS. 3A-3B illustrate example network deployments.
Figure 3B:
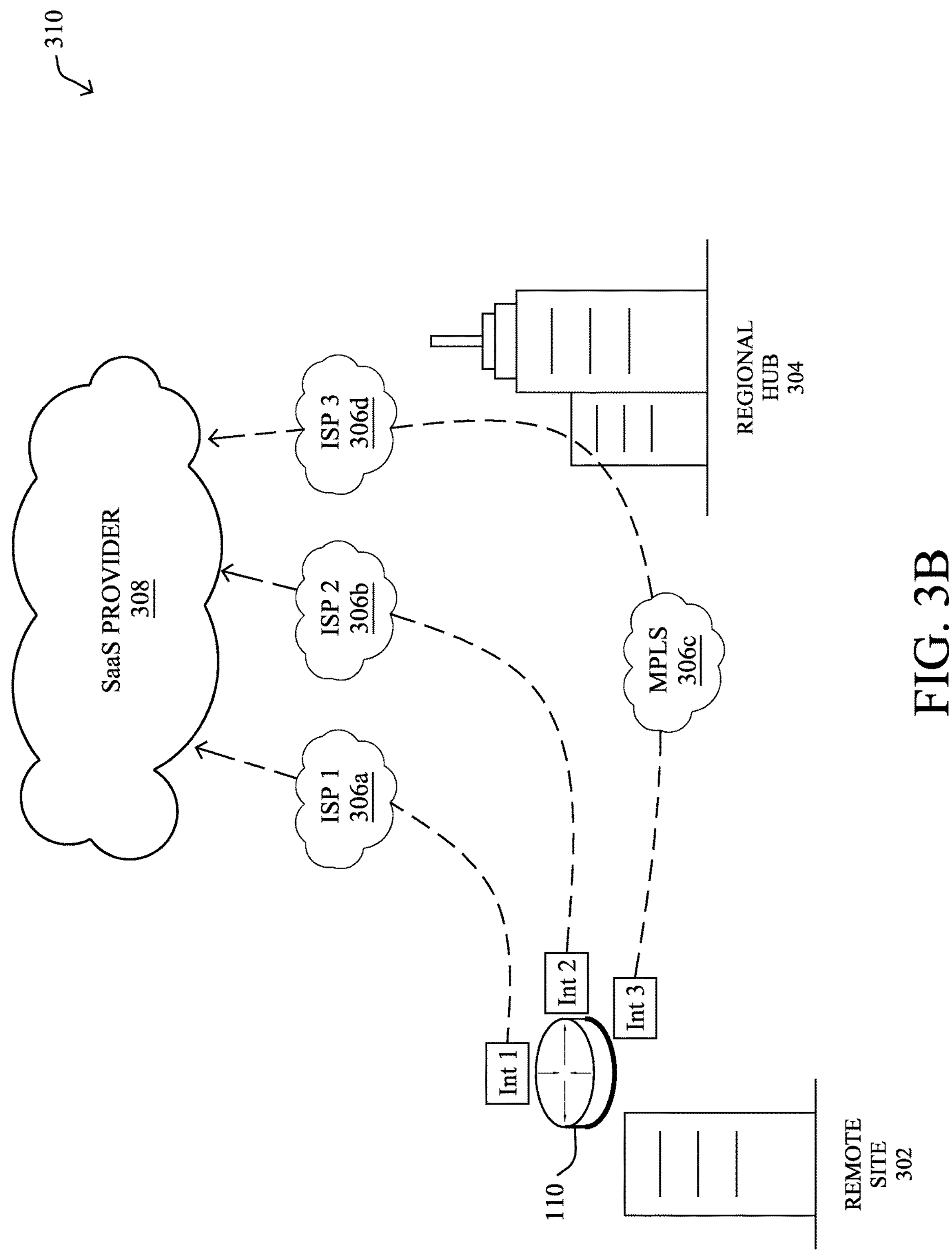

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
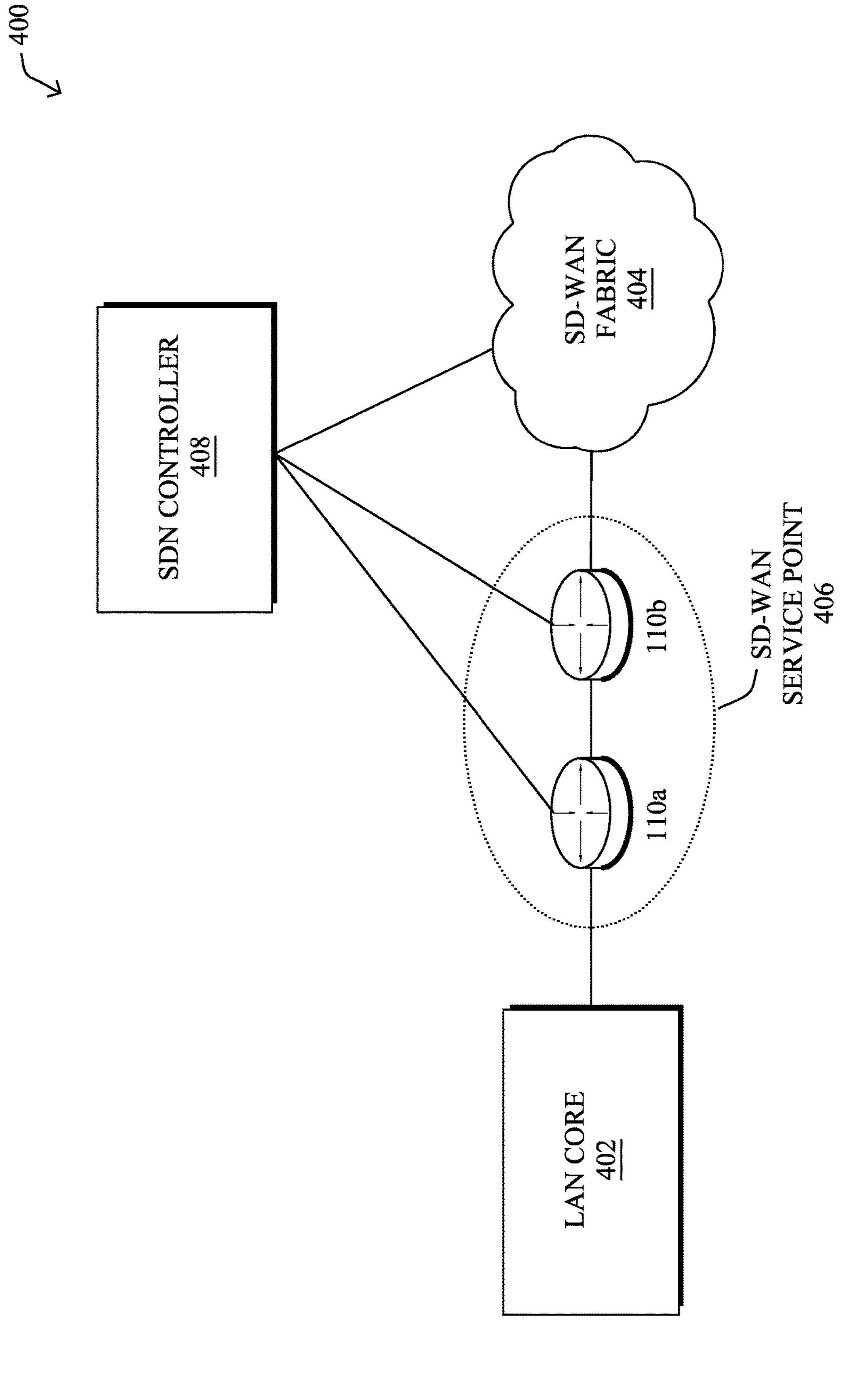
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
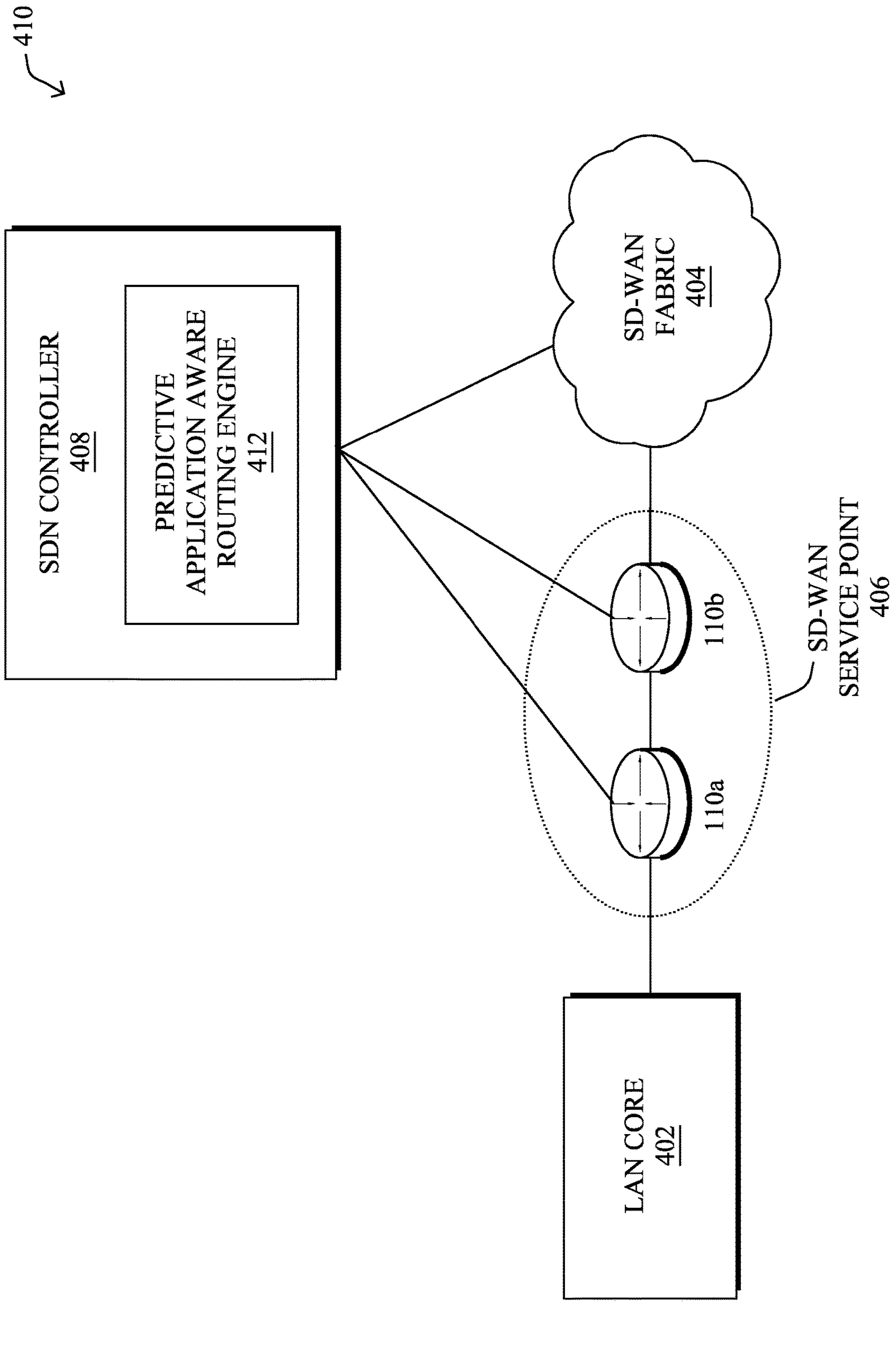

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, assessing the QoE of web-based applications is extremely difficult, as they often feature many different workflows, each triggering very different actions and fulfilling different objectives. For instance, performing a simple task in an online application (e.g., requesting an absence in Workday™, editing a document in O365, etc.) involves multiple user interactions, and can be done using a variety of approaches, each involving different resources to be fetched by the browser (e.g., via Quick Tasks from the homepage, via the Search field, or via the Menu).

Most web browsers today feature extremely detailed troubleshooting tools referred to as "network waterfalls" that generate browser waterfall data, i.e., recordings of network activity, which typically include timing information for resource requests sent by the browser for any given session. For the most part, such waterfall data is used only for specific troubleshooting of an application, and collected by users who face disruptions after being requested to do so by support staff for the application. An observation herein is that the waterfall data from a browser may serve as an extremely rich source of data to automatically assess the QoE of web application users.

—Inferring QoE Degradation from Implicit Signals in User Behavior—

The techniques introduced herein leverage telemetry collected by web browsers and/or browser extension plugins (e.g., network waterfalls, user interactions, etc.) to build graphs of user activity and learn anomaly detection models that can be used locally. These models in turn yield a score that can be used as a weak signal of QoE for an application of interest. In turn, this weak signal is then used for detecting issues across a large cohort of users, identifying root causes (network, application, device), and performing close loop remediation.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device obtains interaction data indicative of a flow of interactions performed by a user with an online application accessible via a network. The device detects an anomaly by applying an anomaly detection model to the interaction data. The device determines that the anomaly is attributable to a condition present in the network. The device causes performance of an adjustment to the network, to mitigate the condition.

Figure 5:
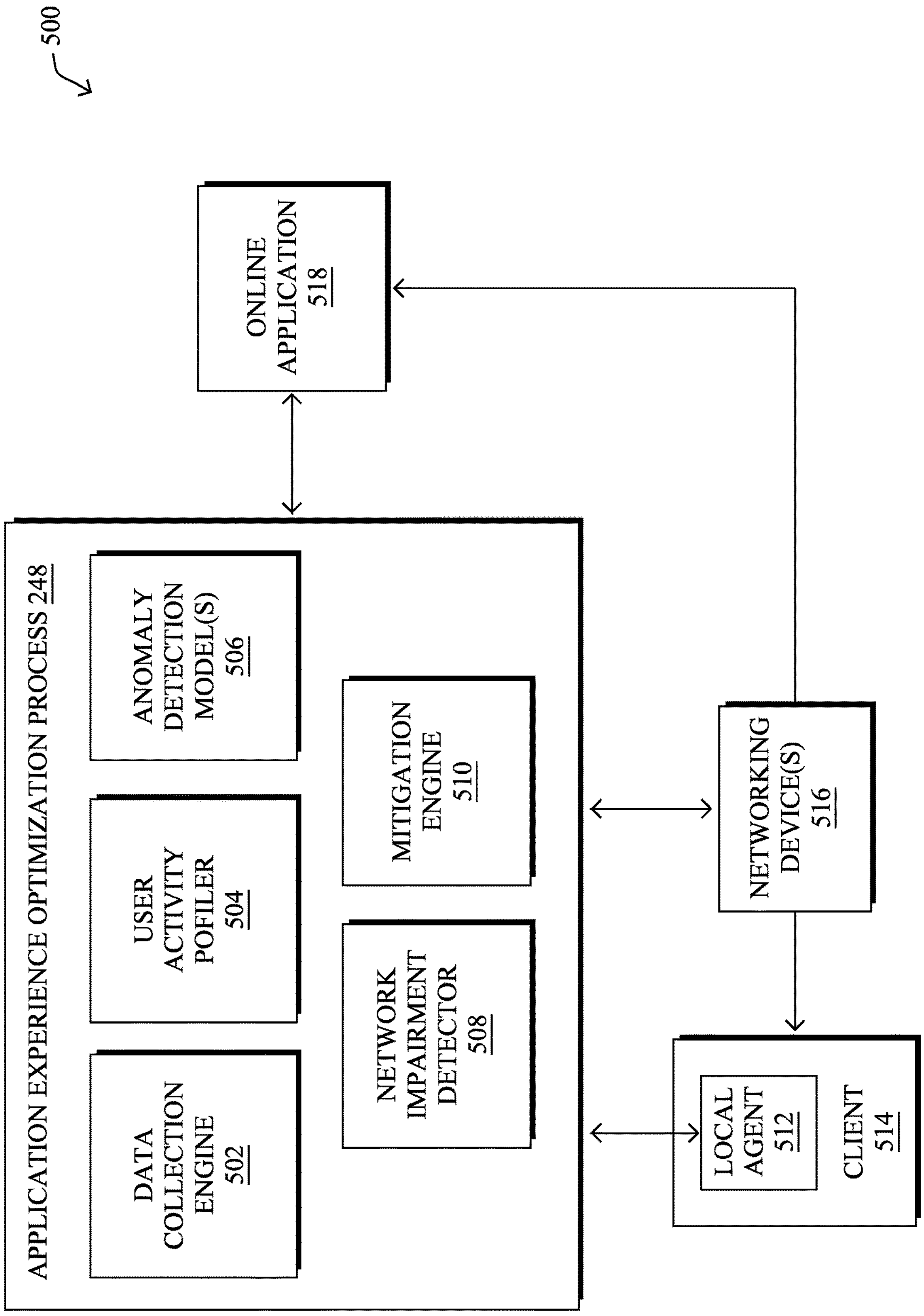
FIG. 5 illustrates an example architecture for inferring quality of experience (QoE) degradation from implicit signals in user behavior.

Operationally, FIG. 5 illustrates an example architecture 500 for inferring quality of experience (QoE) degradation from implicit signals in user behavior, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, a standalone device or service, or the like. In some embodiments, for instance, application experience optimization process 248 may be used to implement a predictive application aware routing engine, such as predictive application aware routing engine 412, or another supervisory service for the network. In other embodiments, application experience optimization process 248 may be used to implement a reactive routing approach in the network.

As shown, application experience optimization process 248 may include any or all of the following components: a data collection engine 502, a user activity profiler 504, an anomaly detection model(s) 506, a network impairment detector 508, and/or a mitigation engine 510. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

According to various embodiments, certain aspects of the techniques herein involve the generation and collection of browser waterfall data. In general, such waterfall data may include a listing of any or all resource requests sent by a web browser of a client, such as client 514 shown, during a session with an online application. For instance, such waterfall data may indicate the resources fetched by the browser during the session, along with the protocol used (e.g., HTTP/2 or HTTP/3, TLS, etc.) the size of a request, the status of a request, the type of document, timing information (e.g., the start and/or end time of the request, which gives a notion of the fetching time), or the like. More advanced analysis of the underlying traffic could, in principle, allow this timing information to be further broken down into network and server delays, as well.

In various embodiments, architecture 500 may include any number of local agents executed by any number of clients, such as local agent 512 executed by client 514, that monitor a configurable set of domains (e.g., workday.com, office.com, github.com) that associated with any number of online applications. In some embodiments, local agent 512 may take the form of a browser plugin for a web browser of client 514 or integrated directly into the web browser or another program of client 514. In various embodiments, local agent 512 may initiate a network waterfall function of the web browser, to generate browser waterfall data for session with a particular online application.

When a user of client 514 initiates a connection with one of the configured domains, local agent 512 may initiate recording of the corresponding network waterfall. The set of “important” domains may be statistically configured or optionally configured according to the user profile. In another embodiment, local agent 512 may monitor the frequency at which a given application is being used. Upon detecting a frequent use (e.g., above a defined threshold), local agent 512 may start prompt the user with a popup message that requests the user to indicate whether the application is considered “important” for the user. Similarly, local agent 512 may stop tracking applications that have not been used for a given period. For instance, assume that client 514 accesses online application 518 via a network that includes one or more networking devices 516. In such a case, local agent 512 may generate the corresponding telemetry for reporting to data collection engine 502, either on a pull or push basis.

The telemetry collected and reported by local agent 512 allows for a better understanding of the actions performed by the user of client 514 within online application 518, all resources received with all types of timers like networking one (initial, load, DNS, TLS times), but also the client-side timers (web browser rendering time). In some embodiments, local agent 512 may also be responsible for data cleaning and normalization, as well, such as prior to reporting any captured telemetry to data collection engine 502. Example client agents that could be modified to support this functionality, for instance, include Cisco AppDynamics, Cisco ThousandEyes, DataDog, NewRelic, and the like.

Other data that data collection engine 502 may obtain could be sourced from the one or more networking devices 516 and/or from online application 518 itself. For instance, the one or more networking devices 516 may provide Netflow information, path probing results, or other such network path telemetry (e.g., delay, jitter, loss, throughput, etc.), local resource usage information (e.g., queue information, memory usage, CPU usage, etc.), or the like. Similarly, online application 518 may provide telemetry generated by online application 518 such as concealment times, user-specified QoE metrics, or the like.

In various embodiments, user activity profiler 504 may be responsible for learning how each user is effectively using online application 518. To this end, user activity profiler 504 may leverage the various data obtained by data collection engine 502. Of course, such data may also be anonymized either by the device that generated that portion of the data, by data collection engine 502, or by user activity profiler 504 on ingestion. In some embodiments, to further protect the privacy of the users of online application 518, the resulting model from user activity profiler 504 may also be deployed to the clients of online application 518 for local execution, once trained.

When data collection engine 502 has accumulated enough data for online application 518 across a sufficient number of users (e.g., above a defined threshold), user activity profiler 504 may use this data to represent the various flows of interactions of the users with online application 518. In some embodiments, user activity profiler 504 may do so by generating what is referred to herein as a User Activity Graph (UAG) from this telemetry.

To generate a UAG, user activity profiler 504 may first identify sets of resources that are often loaded together from the browser waterfall data, thereby forming a meta-resource (in a simple web page, all DOM resources will form a meta-resource, but this may be very different in a complex web application that uses asynchronous requests). User activity profiler 504 may also identify long-lived resources such as WebSockets or "comet" techniques (i.e. polling or long-held HTTPS connections), which should be excluded from the "segmentation" process. When supported by the client agent, such as local agent 512, user interactions (mouse clicks or keyboard events) could also be captured and used by user activity profiler 504 to segment the waterfall into its constitutive meta-resources.

Once user activity profiler 504 has identified meta-resources, it may start constructing the UAG, whose vertices are the meta-resources, and the edges are possible transitions between those. Note that the UAG is the same for all users of a given application, such as online application 518. In the case of a web page, following a hyperlink causes the user to move from one meta-resource to another. In the case of a web application, performing an action such as a mouse click or pressing the enter key causes a switch. In some embodiments, and when the telemetry contains such data, the mouse position and scroll, which may be a relatively good proxy of the gaze of the user, can also be used as a segmentation.

Figure 6:
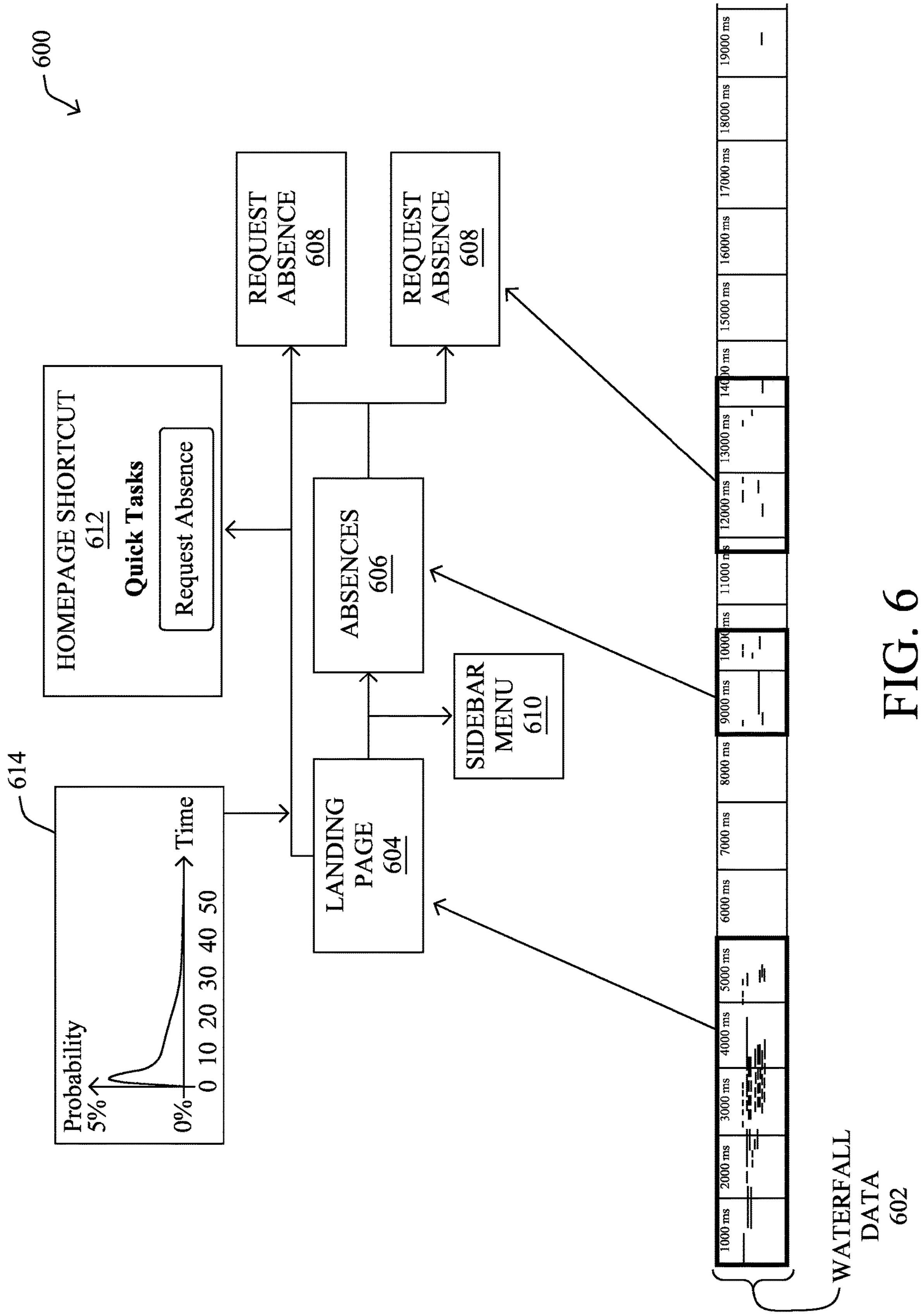
FIG. 6 illustrates an example of detecting an anomaly in the interactions of a user with an online application.

FIG. 6 illustrates an example 600 of detecting an anomaly in the interactions of a user with an online application, in various embodiments. More specifically, example 600 shows the use of waterfall data 602 for the Workday application, to form a highly simplified user activity graph having vertices 604-608 that correspond to the different meta-resources associated with a user requesting a leave of absence via the application.

As shown, each of the meta-resources associated with vertices 604-608 are well separated in waterfall data 602 and each edge of the UAG can be linked back to a user interaction with a DOM element. For instance, after loading the landing page of Workday, a user may either interact with a sidebar menu 610 and then request a leave of absence or interact with a homepage shortcut 612 to directly request a leave of absence. Note that such a clear separation is not necessarily present with all applications, especially single page applications (SPA) that rely heavily on WebSockets. In such cases, user activity profiler 504 may utilize more advanced strategies, such as by determining segmentation strategies from many waterfalls.

Also as shown, the UAG generated by user activity profiler 504 may also associate probabilities over time to users of the application performing specific actions over time. For instance, once a user has loaded the landing page, as represented by vertex 604, the probability 614 over time of that user requesting a leave of absence using homepage shortcut 612 initially spikes, but then rapidly decays as time goes on.

Referring again to FIG. 5, in various embodiments, user activity profiler 504 may also construct UAGs from a global dataset or for different sets of users, based on their characteristics. For instance, user activity profiler 504 may construct different UAGs for different sets of users based on their geographic locations, their employment information (e.g., their industry, their job role or title, etc.), or other such information, to account for the very different uses of online application 518 by its different users. For example, information technology (IT) personnel may use the ServiceNow Incident Management module with specific workflows related to their business while, at the same time, human resources (HR) personnel may use the ServiceNow HR Service Delivery module with completely different workflows. In such situations, it makes sense to create distinct UAGs. In many situations, the distinction between different users is not necessary owing to anomaly detection model(s) 506, which account for the type of task accomplished by the users (that is, the models will assign different transition probabilities depending on whether the user accesses the IT module or the HR module).

In various embodiments, anomaly detection model(s) 506 may model the probability that a user follow a specific flow of interactions along the UAG (e.g., probability 614 in FIG. 6) which may also be time-dependent (e.g., the probability of the user moving along a given edge of the UAG may be very likely within the first thirty seconds, but very unlikely after a full minute has passed). Thus, each UAG may have one or more corresponding anomaly detection model(s) 506.

Another function of anomaly detection model(s) 506 is to detect anomalies within the user interactions of a given user, in view of the modeled probabilities. Indeed, if the user has a very low probability of performing a certain action, but still performs it anyways, this may be indicative of a problem. Importantly, model(s) 506 may also make such an assessment not just on a single action (e.g., clicking on a hyperlink), but on a series of actions, all the way to the completion of the session. This allows the model to account for the type of task accomplished by the user, which in turn influences what should be considered as "normal behavior."

In various embodiments, application experience optimization process 248 may deploy model(s) 506 for local execution by the clients of the online application. For instance, application experience optimization process 248 may deploy the appropriate anomaly detection model(s) 506 for use by local agent 512 on client 514, in one embodiment. Using this approach, local agent 512 can locally analyze the user behavior and push a simple (admittedly noisy) signal back to application experience optimization process 248 (e.g., via a visibility platform such as AppDynamics, ThousandEyes, or any other). Aggregated across a few dozen users, this weak signal, inferred from user activity, becomes a much stronger one and can be used to reliably detect issues with nearly no privacy issue (since the edge client merely sends the identifier of an application and a score, possibly accompanied by the IP address of the user).

In various embodiments, network impairment detector 508 may collect the weak signals (i.e., indications of anomalous user interactions with online application 518) at scale and associate them with Layer 3 metrics (e.g., loss, latency, jitter, etc.) obtained by data collection engine 502. In turn, network impairment detector 508 may use a robust prediction approach, such as percentile regression or the like, to build a model capable of predicting a kind of "best case" score estimate for a given set of network conditions. That is, although the score might decrease for reasons that are completely independent of the network (e.g., a server issue, an overloaded client), the model will predict an upper bound for the score. Then, by comparing the predictions of this model with the actual scores, network impairment detector 508 can determine whether the issue is related to a condition in the network.

For the sake of illustration, assume that the score lies in the [0, 1] interval (the higher, the better). If the model predicts an upper bound of 0.98 and the actual score is at 0.23, there is a QoE disruption, but the network is likely not the root cause. However, if the model predicts an upper bound of 0.34 and the actual score at 0.29, there is a QoE disruption, and the network is likely to be part of the problem. In further embodiments, network impairment detector 508 may also use a similar approach based on device level telemetry (e.g., CPU, memory, temperature) used for device root causing.

In various embodiments, mitigation engine 510 may rely on the root cause of the QoE degradation indicated by network impairment detector 508 to close the loop with the network (e.g., the one or more networking devices 516), online application 518, and/or client 514. For instance, mitigation engine 510 may instruct the one or more networking devices 516 or client 514 to reroute traffic associated with online application 518 via a different network path for which the network model predicts a high upper bound. In the case of client 514 rerouting the traffic, this could be achieved by changing the SSID that it uses, switching VPN endpoints, or the like. Mitigation engine 510 could also instruct application 518 to alter the path, such as by influencing its BGP advertisement, using DNS to redirect traffic to a different network area, or by using caching from content delivery networks. Such mitigation strategies may or may not be automated (e.g., by first requiring approval from a network administrator), but in every case, they can be pre-validated by running network tests along the newly allocated path, and checking whether the QoE upper bound predicted by the network model increases.

Figure 7:
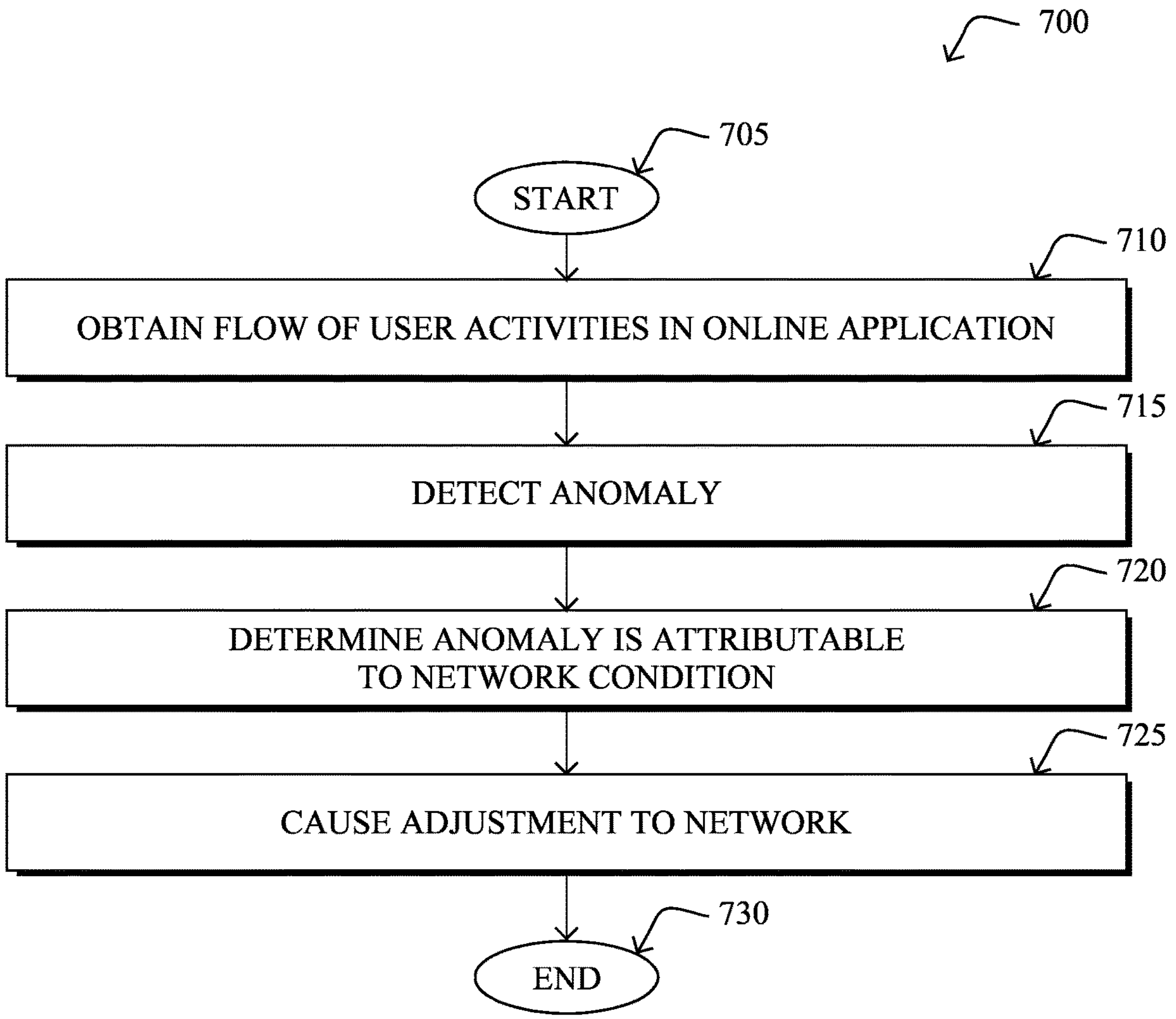
FIG. 7 illustrates an example simplified procedure for inferring quality of experience (QoE) degradation from implicit signals in user behavior.

FIG. 7 illustrates an example simplified procedure 700 (e.g., a method) for inferring quality of experience (QoE) degradation from implicit signals in user behavior, in accordance with one or more embodiments described herein. For example, a non-generic, specifically configured device (e.g., device 200) may perform procedure 700 by executing stored instructions (e.g., application experience optimization process 248). The procedure 700 may start at step 705, and continues to step 710, where, as described in greater detail above, the device may obtain interaction data indicative of a flow of interactions performed by a user with an online application accessible via a network. In various embodiments, the interaction data is based on browser waterfall data captured by a web browser or a browser plugin installed to an endpoint operated by the user and used to access the online application via the network. In some embodiments, the browser waterfall data indicates resource requests sent by the web browser during a session with the online application, protocol information for the resource requests, and timing information for the resource requests. In one embodiment, the device may also provide the interaction data to a user interface for display. In further embodiments, the interaction data comprises a graph of user actions within the online application.

At step 715, as detailed above, the device may detect an anomaly by applying an anomaly detection model to the interaction data, as described in greater detail above. In some embodiments, the anomaly detection model is specific to a geographic location or employment information associated with the user. In a further embodiment, the anomaly detection model computes a probability of the user performing a particular action within the online application over time.

At step 720, device may determine that the anomaly is attributable to a condition present in the network, as described in greater detail above. In some embodiments, the device may do so by using network telemetry and an indication of the anomaly as input to a prediction model that predicts a presence of the condition in the network. In various embodiments, the network telemetry is indicative of at least one of path loss, latency, or jitter in the network.

At step 725, as detailed above, the device may cause performance of an adjustment to the network, to mitigate the condition. In various embodiments, the adjustment to the network comprises rerouting application traffic sent between an endpoint of the user and the online application via a first path in the network to a second path in the network.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for inferring quality of experience (QoE) degradation from implicit signals in user behavior, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

obtaining, by a device, interaction data indicative of a flow of interactions performed by a user with an online application accessible via a network, wherein the interaction data is captured by a web browser or a browser plugin installed to an endpoint operated by the user and used to access the online application via the network;

determining, by the device, a first score indicative of an anomaly associated with the interactions performed by the user by applying an anomaly detection model to the interaction data, wherein the anomaly detection model compares the interaction data to a user activity graph to detect the anomaly;

inputting, by the device, network telemetry and the first score indicative of the anomaly as input to a prediction model;

generating, by the device, through executing the prediction model, and based on the network telemetry and the first score indicative of the anomaly, a second score indicative of a presence of a network performance condition in the network; and causing, by the device and based on the first score indicative of the anomaly associated with the interactions performed by the user and the second score indicative of the presence of the network performance condition, performance of an adjustment to the network to mitigate the network performance condition.

2. The method as in claim 1, wherein the adjustment to the network comprises rerouting application traffic sent between an endpoint of the user and the online application via a first path in the network to a second path in the network.

3. The method as in claim 1, wherein the network telemetry is indicative of at least one of path loss, latency, or jitter in the network.

4. The method as in claim 1, wherein the interaction data is based on browser waterfall data that is captured by the web browser or the browser plugin.

5. The method as in claim 4, wherein the browser waterfall data indicates resource requests sent by the web browser during a session with the online application, protocol information for the resource requests, and timing information for the resource requests.

6. The method as in claim 1, wherein the anomaly detection model is specific to a geographic location or employment information associated with the user.

7. The method as in claim 1, wherein the anomaly detection model computes a probability of the user performing a particular action within the online application over time as the first score, and the first score indicates a Quality of Experience (QoE) of the user with the online application.

8. The method as in claim 1, further comprising:

providing, by the device, the interaction data to a user interface for display.

9. The method as in claim 1, wherein the interaction data comprises a graph of user actions within the online application.

10. An apparatus, comprising:

one or more network interfaces;

a processor coupled to the one or more network interfaces and configured to execute one or more processes; and a memory configured to store a process that is executable by the processor, the process when executed configured to:

obtain interaction data indicative of a flow of interactions performed by a user with an online application accessible via a network, wherein the interaction data is captured by a web browser or a browser plugin installed to an endpoint operated by the user and used to access the online application via the network;

determine a first score indicative of an anomaly associated with the interactions performed by the user, by applying an anomaly detection model to the interaction data, wherein the anomaly detection model compares the interaction data to a user activity graph to detect the anomaly;

input network telemetry and the first score indicative of the anomaly to a prediction model;

generate, through executing the prediction model, and based on the network telemetry and the first score indicative of the anomaly, a second score indicative of a presence of a network performance condition in the network; and cause, based on the first score indicative of the anomaly associated with the interactions performed by the user and the second score indicative of the presence of the network performance condition, a performance of an adjustment to the network to mitigate the network performance condition.

11. The apparatus as in claim 10, wherein the adjustment to the network comprises rerouting application traffic sent between an endpoint of the user and the online application via a first path in the network to a second path in the network.

12. The apparatus as in claim 10, wherein the network telemetry is indicative of at least one of path loss, latency, or jitter in the network.

13. The apparatus as in claim 10, wherein the interaction data is based on browser waterfall data captured by the web browser or the browser plugin.

14. The apparatus as in claim 13, wherein the browser waterfall data indicates resource requests sent by the web browser during a session with the online application, protocol information for the resource requests, and timing information for the resource requests.

15. The apparatus as in claim 10, wherein the anomaly detection model is specific to a geographic location or employment information associated with the user.

16. The apparatus as in claim 10, wherein the anomaly detection model computes a probability of the user performing a particular action within the online application over time as the first score, and the first score indicates a Quality of Experience (QoE) of the user with the online application.

17. The apparatus as in claim 10, wherein the process when executed is further configured to:

provide the interaction data to a user interface for display.

18. A tangible, non-transitory, computer-readable medium storing program instructions that cause a device to execute a process comprising:

obtaining, by the device, interaction data indicative of a flow of interactions performed by a user with an online application accessible via a network, wherein the interaction data is captured by a web browser or a browser plugin installed to an endpoint operated by the user and used to access the online application via the network;

determining, by the device, a first score indicative of an anomaly associated with the interactions performed by the user, by applying an anomaly detection model to the interaction data, wherein the anomaly detection model compares the interaction data to a user activity graph to detect the anomaly;

inputting, by the device, network telemetry and the first score indicative of the anomaly to a prediction model;

generating, by the device, through executing the prediction model, and based on the network telemetry and the first score indicative of the anomaly, a second score indicative of a presence of a network performance condition in the network; and causing, by the device and based on the first score indicative of the anomaly associated with the interactions performed by the user and the second score indicative of the presence of the network performance condition, performance of an adjustment to the network to mitigate the network performance condition.

19. The method of claim 1, wherein causing, by the device and based on the first score indicative of the anomaly associated with the interactions performed by the user and the second score indicative of the presence of the network performance condition, performance of an adjustment to the network to mitigate the network performance condition, further comprises:

comparing, by the device, the first score with the second score; and determining, by the device and based on a difference between the first score and the second score, that the anomaly is caused by the network performance condition.

20. The method of claim 1, wherein the anomaly detection model includes a machine learning model that is trained by performing:

classifying training data into classes based at least in part on labels associated with the training data; and minimizing a cost function associated with the machine learning model.

* * * * *